(12) United States Patent
Wang et al.

(10) Patent No.: US 11,378,999 B2
(45) Date of Patent: Jul. 5, 2022

(54) APPARATUS FOR GENERATING SYNCHRONIZED CLOCK SIGNALS, ELEC-TRONIC SYSTEM, BASE STATION AND MOBILE DEVICE

(71) Applicant: Intel Corporation, Santa Clara, CA (US)

(72) Inventors: Yu-Shan Wang, Hillsboro, OR (US); Martin Clara, Santa Clara, CA (US); Daniel Gruber, St. Andrae (AT); Hundo Shin, Santa Clara, CA (US); Kameran Azadet, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 273 days.

(21) Appl. No.: 16/724,486

(22) Filed: Dec. 23, 2019

(65) Prior Publication Data
US 2021/0191455 A1 Jun. 24, 2021

(51) Int. Cl.
*G06F 1/12* (2006.01)
*G06F 1/14* (2006.01)
*G06F 1/08* (2006.01)

(52) U.S. Cl.
CPC .............. *G06F 1/12* (2013.01); *G06F 1/08* (2013.01); *G06F 1/14* (2013.01)

(58) Field of Classification Search
CPC ...................................... G06F 1/12; G06F 1/14
See application file for complete search history.

(56) References Cited

U.S. PATENT DOCUMENTS

| | | | | |
|---|---|---|---|---|
| 6,993,671 | B2* | 1/2006 | Pricer | G06F 1/12 713/400 |
| 7,642,812 | B1* | 1/2010 | Xue | H03K 23/54 326/93 |
| 10,432,209 | B1* | 10/2019 | Mikes | H03M 1/0624 |
| 10,439,618 | B2* | 10/2019 | Robin | H03K 21/026 |
| 10,833,839 | B1* | 11/2020 | Tang | H04L 25/028 |
| 2003/0052708 | A1* | 3/2003 | Momtaz | G06F 5/10 326/37 |
| 2008/0186063 | A1* | 8/2008 | Jewett | H03K 21/08 327/117 |

* cited by examiner

*Primary Examiner* — Phil K Nguyen
(74) *Attorney, Agent, or Firm* — 2SPL Patent Attorneys PartG mbB; Yong Beom Hwang

(57) ABSTRACT

An apparatus for generating synchronized clock signals is provided. The apparatus comprises a first circuit comprising a clock divider circuit configured to receive a first clock signal and to generate a second clock signal by frequency dividing the first clock signal. Further, the apparatus comprises a one or more second circuits comprising a respective synchronization circuit configured to receive the first clock signal. The synchronization circuit of one of the one or more second circuits is configured to receive the second clock signal from the first circuit and to resample the second clock signal based on the first clock signal in order to generate a replica of the second clock signal that is in phase with the second clock signal.

16 Claims, 5 Drawing Sheets

APPARATUS FOR GENERATING SYNCHRONIZED CLOCK SIGNALS, ELEC-TRONIC SYSTEM, BASE STATION AND MOBILE DEVICE

FIELD

The present disclosure relates to clock generation. In particular, examples relate to an apparatus for generating synchronized clock signals, an electronic system, a base station and a mobile device.

BACKGROUND

In many applications, a respective clock signal is to be supplied to the individual electronic components in an array of the electronic component. For proper function of the array of the electronic components, the clock signals for the individual electronic components need to be in phase.

Hence, there may be a desire for an architecture for generating synchronized clock signals.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a", "an" and "the" is used and using only a single element is neither explicitly nor implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
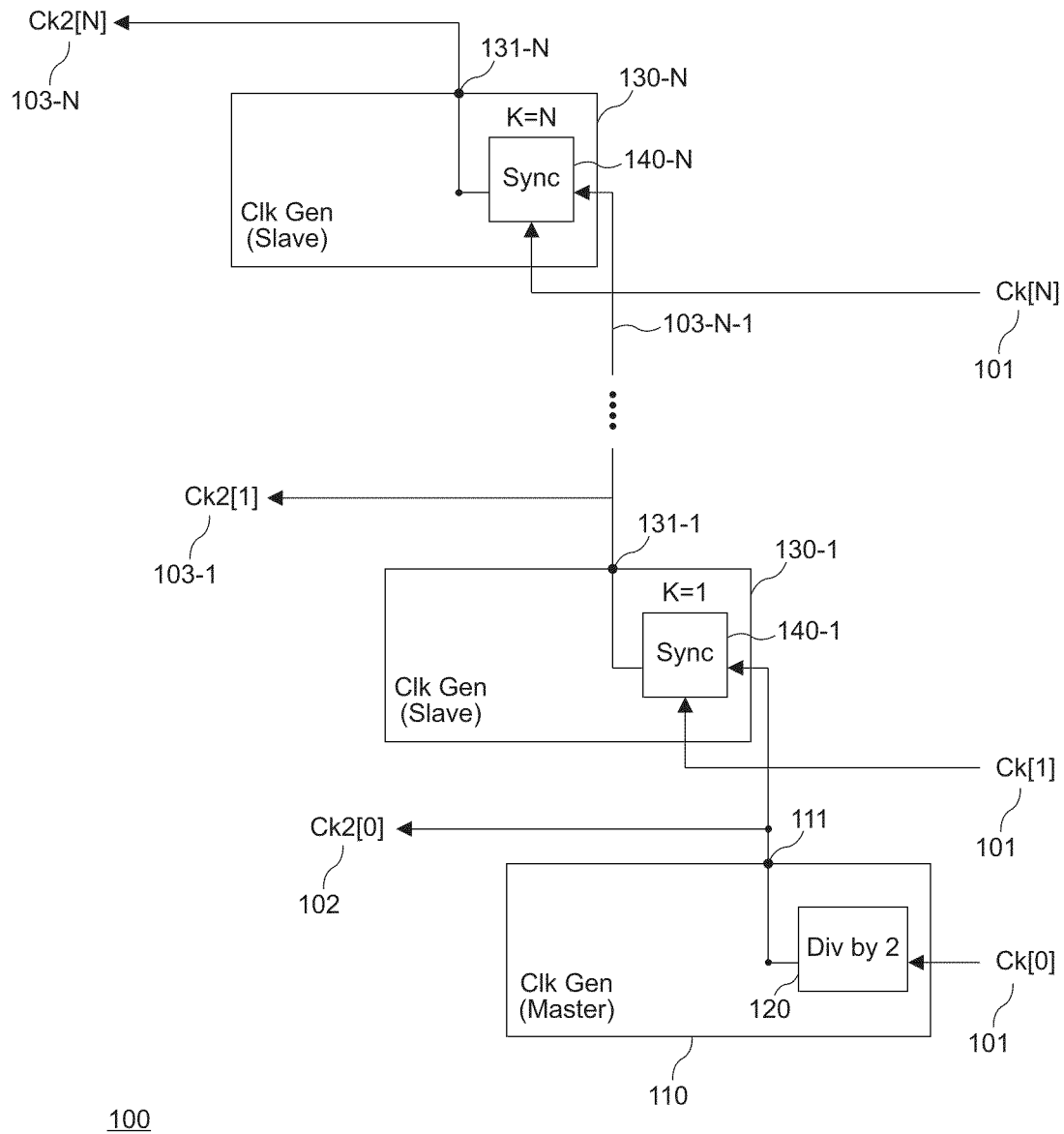
FIG. 1 illustrates a first example of an apparatus for generating synchronized clock signals.

FIG. 1 illustrates an example of an apparatus 100 for generating synchronized clock signals.

The apparatus 100 comprises a first circuit 110. The first circuit 110 comprises a clock divider circuit 120 configured to receive a first clock signal 101. The first clock 101 may be a single-ended signal or a differential signal. Further, the clock divider circuit 120 is configured to generate a second clock signal 102 by frequency dividing the first clock signal 101. The clock divider circuit 120 may frequency divide the first clock signal 101 by any divider value in order to generate the second clock signal 102 (exhibiting a lower frequency than the first clock signal 101). For example, the clock divider circuit 120 may be configured to frequency divide the first clock signal 101 by an integer value such as 2, 4, 8, 16, etc. in order to generate the second clock signal 102. In other examples, the clock divider circuit 120 may be configured to frequency divide the first clock signal 101 by a fractional value such as 1.25, 1.75, 2.5, etc. in order to generate the second clock signal 102. The first circuit 110 comprises an output node 111 for outputting the generated second clock signal 102.

The apparatus 100 additionally comprises a series of second circuits 130-1, ..., 130-N. The series of second circuits 130-1, ..., 130-N is a plurality of the second circuits 130-1, ..., 130-N. The plurality/series of second circuits 130-1, ..., 130-N may be any number N≥2 of second circuits. The plurality/series of second circuits 130-1, ..., 130-N are logically, but not necessarily physically, arranged in series. Each second circuit of the series of second circuits 130-1, ..., 130-N comprises a respective synchronization circuit 140-1, ..., 140-N configured to receive the first clock signal 101.

The synchronization circuit 140-1 of the first second circuit 130-1 of the series of second circuits 130-1, ..., 130-N is configured to receive the second clock signal 102 from the first circuit 110. The synchronization circuit 140-1 is further configured to resample (retime, re-synchronize) the second clock signal 102 based on the first clock signal 101 in order to generate a replica 103-1 of the second clock signal that is in phase with the second clock signal 102.

The synchronization circuits of the other ones of the series of second circuits 130-1, ..., 130-N are configured to receive the respective replica of the second clock signal generated by the respective preceding second circuit in the series of second circuits 130-1, ..., 130-N. Further, the synchronization circuits of the other ones of the series of second circuits 130-1, ..., 130-N are configured to resample (retime, re-synchronize) the respectively received replica of the second clock signal based on the first clock signal 101 in order to generate a respective replica of the second clock signal that is in phase with the second clock signal 102. This is exemplarily illustrated in FIG. 1 for the N-th second circuit 130-N.

The synchronization circuit 140-N of the N-th second circuit 130-N of the series of second circuits 130-1, . . . , 130-N is configured to receive the replica 103-N−1 of the second clock signal generated by the preceding, i.e. the N−1$^{st}$, second circuit in the series of second circuits 130-1, . . . , 130-N. The synchronization circuit 140-N is configured to resample the received replica 103-N−1 of the second clock signal based on the first clock signal 101 in order to generate its replica 103-N of the second clock signal that is in phase with the second clock signal 102.

Further indicated in FIG. 1 is that the replica 103-1 of the second clock signal generated by the first second circuit 130-1 is supplied to the succeeding, i.e. the second, second circuit in the series of second circuits 130-1, . . . , 130-N such that the succeeding second circuit in the series of second circuits 130-1, . . . , 130-N can resample the replica 103-1 of the second clock signal based on the based on the first clock signal 101 in order to generate its replica of the second clock signal that is in phase with the second clock signal 102.

Each of the second circuits 130-1, . . . , 130-N comprises a respective output node 131-1, . . . , 131-N for outputting the respectively generated replica 103-1, . . . , 103-N of the second clock signal.

The apparatus 100 may, hence, allow to generate the clock signal 102 and N synchronized replicas 103-1, . . . , 103-N of the second clock signal in parallel. Accordingly, synchronized clock signals for N+1 channels or electronic elements may be provided (generated) by the apparatus 100 in parallel. The apparatus 100 is modular and thus scalable to the required number of synchronized clock signals. For example, if the individual electronic elements of an array (e.g. a big array) need to be supplied with a respective synchronized clock signal, the apparatus 100 may allow to guarantee that the synchronized clock signals are all in phase across the array. The synchronicity of the clock signals may be guaranteed since the apparatus 100 uses a central clock divider in the first circuit 110 and since the second circuits 120 enable local resampling with a high-speed clock (i.e. the first clock 101).

The synchronization circuits 140-1, . . . , 140-2 of the second circuits 130-1, . . . , 130-N may be implemented identical or different. In other words, identical or different synchronizer topologies may be used.

In some examples, the apparatus 100 may comprises only one (i.e. a single) second circuit (e.g. the second circuit 130-1). For example, if only one synchronized replica of the clock signal 102 is required, it may be sufficient to provide only one second circuit for resampling the clock signal 102.

Figure 2:
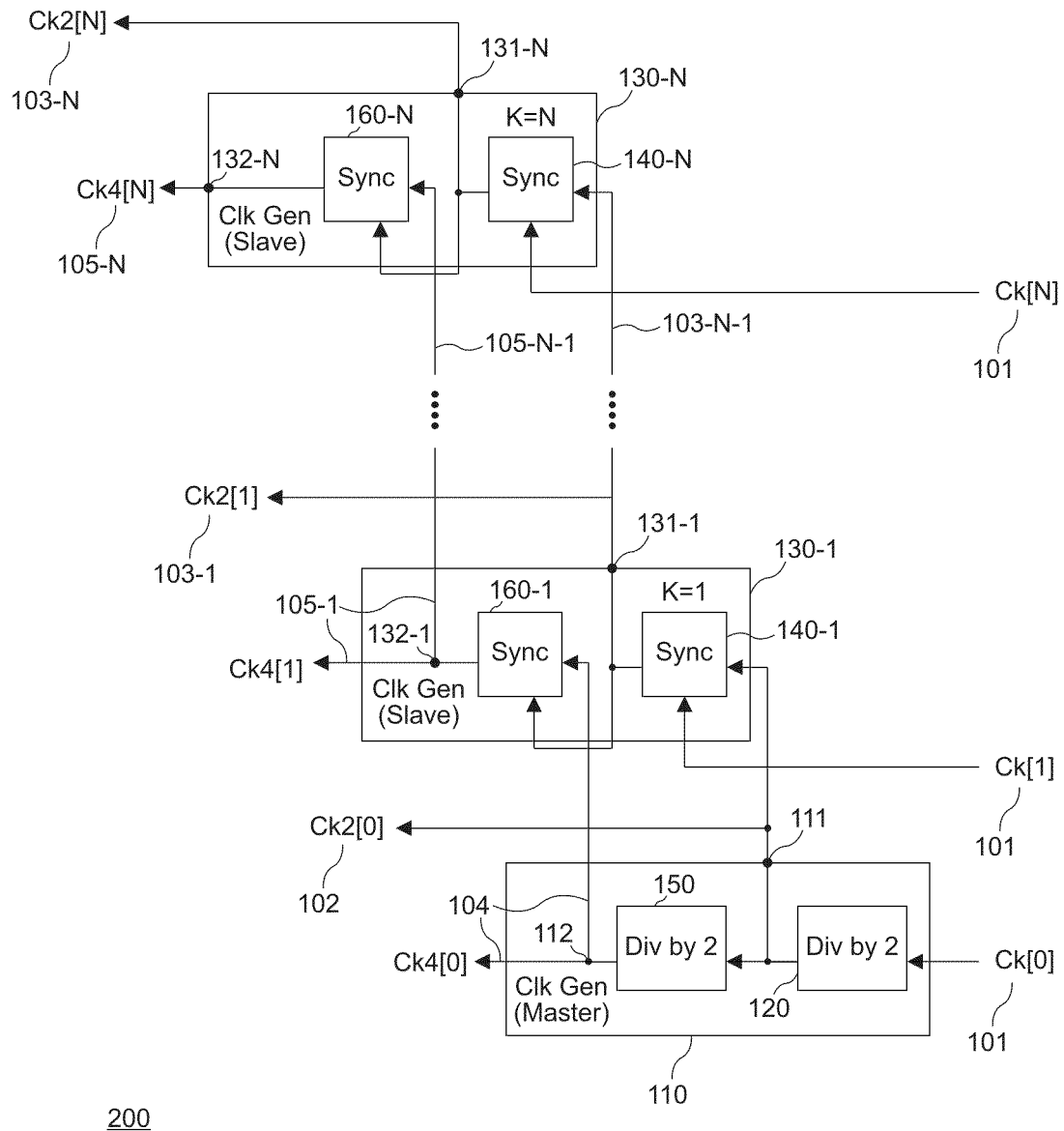
FIG. 2 illustrates a second example of an apparatus for generating synchronized clock signals.

FIG. 2 illustrates another example of an apparatus 200 for generating synchronized clock signals. Compared to the apparatus 100, the apparatus 200 is capable of providing N+1 additional synchronized clock signals at another frequency.

In the example of FIG. 2, the first circuit 110 additionally comprises a second clock divider circuit 150. The second clock divider circuit 150 is configured to receive the second clock signal 102 generated by the first clock divider circuit 120. Further, the second clock divider circuit 150 is configured to generate a third clock 104 signal by frequency dividing the second clock signal 102. The second clock divider circuit 150 may frequency divide the second clock signal 102 by any divider value in order to generate the third clock signal 104. For example, the second clock divider circuit 150 may be configured to frequency divide the second clock signal 102 by an integer value in order to generate the third clock signal 104. In other examples, the second clock divider circuit 150 may be configured to frequency divide the second clock signal 102 by a fractional value in order to generate the third clock signal 104. The first circuit 110 comprises a second output node 112 for outputting the third clock signal 104.

Accordingly, the second clock signal 102 and the third clock signal 104 exhibit different frequencies. In particular, the third clock signal 104 exhibits a lower frequency than the second clock signal 102.

The first clock divider circuit 120 and the second clock divider circuit 150 may be implemented identical or different. In other words, identical or different divider topologies may be used. Further, the first clock divider circuit 120 and the second clock divider circuit 150 may frequency divide their respective input clock signal by the same or different divider values. In the example of FIG. 2, the first clock divider circuit 120 and the second clock divider circuit 150 both frequency divide their respective input clock signal by a divider value of two. However, as described above, the first clock divider circuit 120 and the second clock divider circuit 150 may alternatively use other divider values.

In the example of FIG. 2, each second circuit of the series of second circuits 130-1, . . . , 130-N additionally comprises a respective second synchronization circuit 160-1, . . . , 160-N configured to receive the respective replica 103-1, . . . , 103-N of the second clock signal generated locally at the respective second circuit 130-1, . . . , 130-N. This is exemplarily illustrated in FIG. 2 for the second circuits 130-1 and 130-N. The second synchronization circuit 160-1 of the second circuit 130-1 receives the replica 103-1 of the second clock signal generated locally at the second circuit 130-1 by the synchronization circuit 140-1. Analogously, the second synchronization circuit 160-N of the second circuit 130-N receives the replica 103-N of the second clock signal generated locally at the second circuit 130-N by the synchronization circuit 140-N.

The second synchronization circuit 160-1 of the first second circuit 130-1 of the series of second circuits 130-1, . . . , 130-N is configured to receive the third clock signal 104 from the second output node 112 first circuit 110. Further, the second synchronization circuit 160-1 is configured to resample the third clock signal 104 based on the replica 103-1 of the second clock signal generated locally at the first one of the series of second circuits 130-1, . . . , 130-N in order to generate a replica 105-1 of the third clock signal that is in phase with the third clock signal 104.

The second synchronization circuits of the other ones of the series of second circuits 130-1, . . . , 130-N are configured to receive the respective replica of the third clock signal generated by the respective preceding second circuit in the series of second circuits 130-1, . . . , 130-N. Further, the second synchronization circuits of the other ones of the series of second circuits 130-1, . . . , 130-N are configured to resample the respectively received replica of the third clock signal based on the respective replica of the second clock signal generated locally at the respective second circuit in order to generate a respective replica of the third clock signal that is in phase with the third clock signal 104. This is exemplarily illustrated in FIG. 2 for the N-th second circuit 130-N.

The second synchronization circuit 160-N of the N-th second circuit 130-N of the series of second circuits 130-1, . . . , 130-N is configured to receive the replica 105-N−1 of the third clock signal generated by the preceding, i.e. the N−1$^{st}$, second circuit in the series of second circuits 130-1, . . . , 130-N. Further, the second synchronization circuit 160-N is configured to resample the received replica 105-N−1 of the third clock signal based on the replica 103-N of the second clock signal generated locally at the N-th second circuit 130-N in order to generate its replica 105-N of the third clock signal that is in phase with the third clock signal 104.

Further indicated in FIG. 2 is that the replica 105-1 of the third clock signal generated by first second circuit 130-1 is supplied to the succeeding, i.e. the second, second circuit in the series of second circuits 130-1, . . . , 130-N such that the succeeding second circuit in the series of second circuits 130-1, . . . , 130-N can resample the replica 105-1 of the third clock signal based on the second clock signal generated locally at the succeeding second circuit in order to generate its replica of the third clock signal that is in phase with the third clock signal 104.

Each of the second circuits 130-1, . . . , 130-N comprises a respective second output node 132-1, . . . , 132-N for outputting the respective replica 105-1, . . . , 105-N of the third clock signal.

In addition to the second clock signal 102 and the N synchronized replicas 103-1, . . . , 103-N of the second clock signal, the apparatus 200 may, hence, allow to generate in parallel the third clock signal 103 and N synchronized replicas 105-1, . . . , 105-N of the third clock signal.

In other words, in the example of FIG. 2, the master slice or central clock divider 110 takes a full rate (at frequency Fs) clock (CK) and uses two—e.g. divided by 2—clock dividers 120 and 160 to generate Fs/2 and Fs/4 clocks (CK2 and CK4). The generated CK2 and CK4 clocks then propagate to the nearby slave slice 130-1. The CK2[$k$−1] clocks are resampled with CK[$k$] clock locally at each slice to generate CK2[$k$]. The CK4[$k$−1] clocks are resampled with CK2[$k$] clock locally at each slice to generate CK4[$k$]. The propagation continues to the last slice 130-N, i.e. clocks from slice #(k−1) propagate to slice #k.

Figure 3:
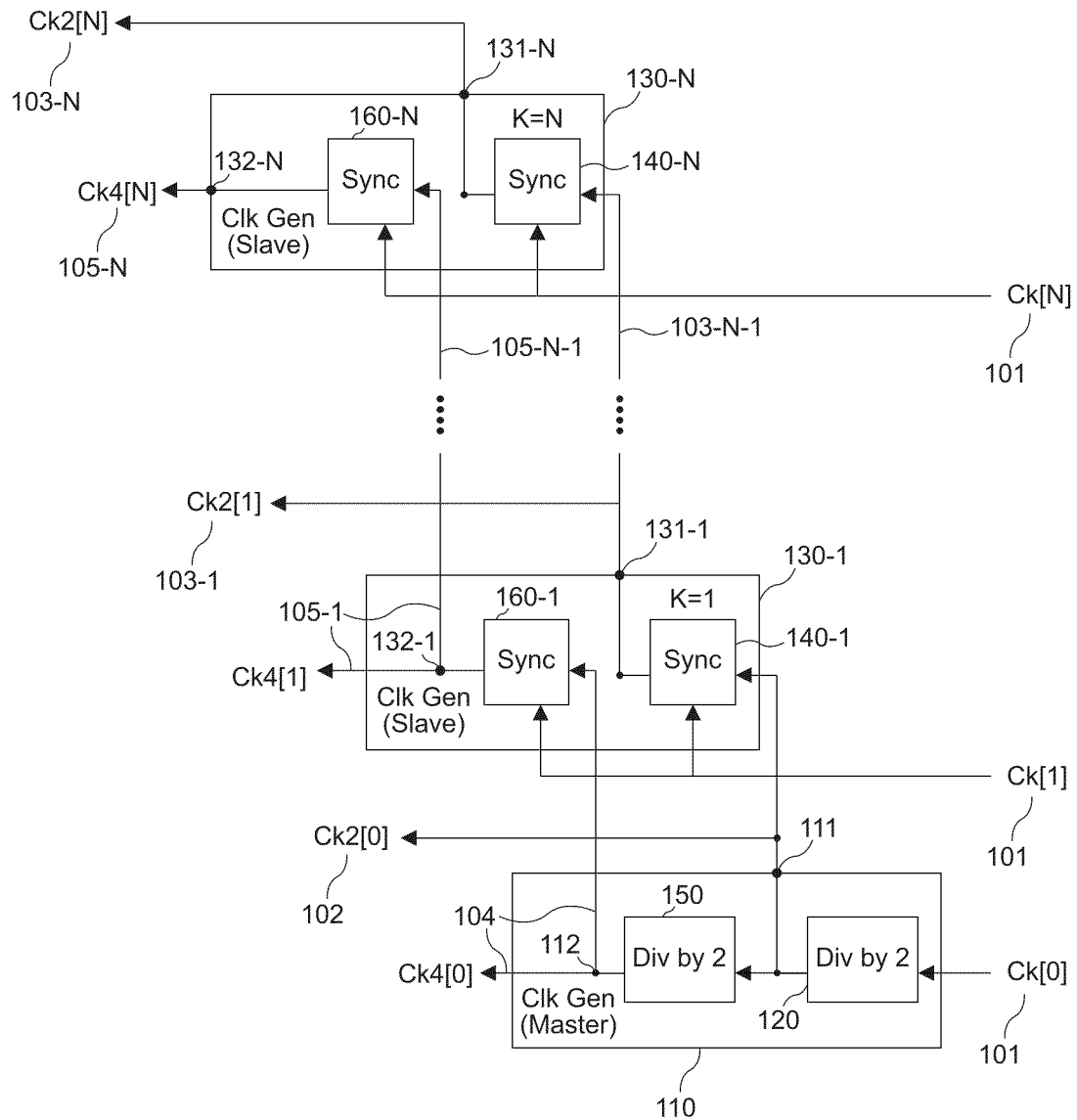
FIG. 3 illustrates a third example of an apparatus for generating synchronized clock signals.

FIG. 3 illustrates another example of an apparatus 300 for generating synchronized clock signals. Compared to apparatus 200, the second synchronization circuit 160-1, . . . , 160N use the first clock signal 101 for sampling instead of the locally generated replicas 103-1, . . . , 103-N of the second clock signal.

In the example of FIG. 3, the second synchronization circuits 160-1, . . . , 160N are configured to receive the first clock signal 101 instead of the replicas 103-1, . . . , 105-N of the second clock signal.

Accordingly, the second synchronization circuit 160-1 of the first second circuit 130-1 of the series of second circuits 130-1, . . . , 130-N is configured to resample the third clock 104 signal based on the first clock signal 101 in order to generate its replica 105-1 of the third clock signal that is in phase with the third clock signal 104.

Similarly, the second synchronization circuits of the other ones of the series of second circuits 130-1, . . . , 130-N are configured to receive the respective replica of the third clock signal generated by the respective preceding second circuit in the series of second circuits 130-1, . . . , 130-N. The second synchronization circuits of the other ones of the series of second circuits 130-1, . . . , 130-N are further configured to resample the respectively received replica of the third clock signal based on the first clock signal 101 in order to generate a respective replica of the third clock signal that is in phase with the third clock signal 104.

This is exemplarily illustrated in FIG. 3 for the N-th second circuit 130-N. The second synchronization circuit 160-N of the N-th second circuit 130-N of the series of second circuits 130-1, . . . , 130-N is configured to receive the replica 105-N−1 of the third clock signal generated by the preceding, i.e. the N−1$^{st}$, second circuit in the series of second circuits 130-1, . . . , 130-N. Further, the second synchronization circuit 160-N is configured to resample the received replica 105-N−1 of the third clock signal based on the first clock signal 101 in order to generate its replica 105-N of the third clock signal that is in phase with the third clock signal 104.

Like the apparatus 200, the apparatus 300 may allow to generate in parallel the third clock signal 103 and N synchronized replicas 105-1, . . . , 105-N of the third clock signal in addition to the second clock signal 102 and the N synchronized replicas 103-1, . . . , 103-N of the second clock signal.

In the examples of FIG. 2 and FIG. 3, the first synchronization circuits 140-1, . . . , 140-N and the second synchronization circuits 160-1, . . . , 160N may be implemented identical or different. In other words, identical or different synchronizer topologies may be used.

It is to be noted that the first circuit 110 may comprise one or more additional clock divider circuits compared to the examples of FIGS. 2 and 3 in order to generate one or more additional clock signals. Accordingly, each of the series of second circuits 130-1, . . . , 130-N may comprise one or more additional synchronization circuits for generating synchronized replicas of the one or more additional clock signals in accordance with the above described architecture.

Figure 4:
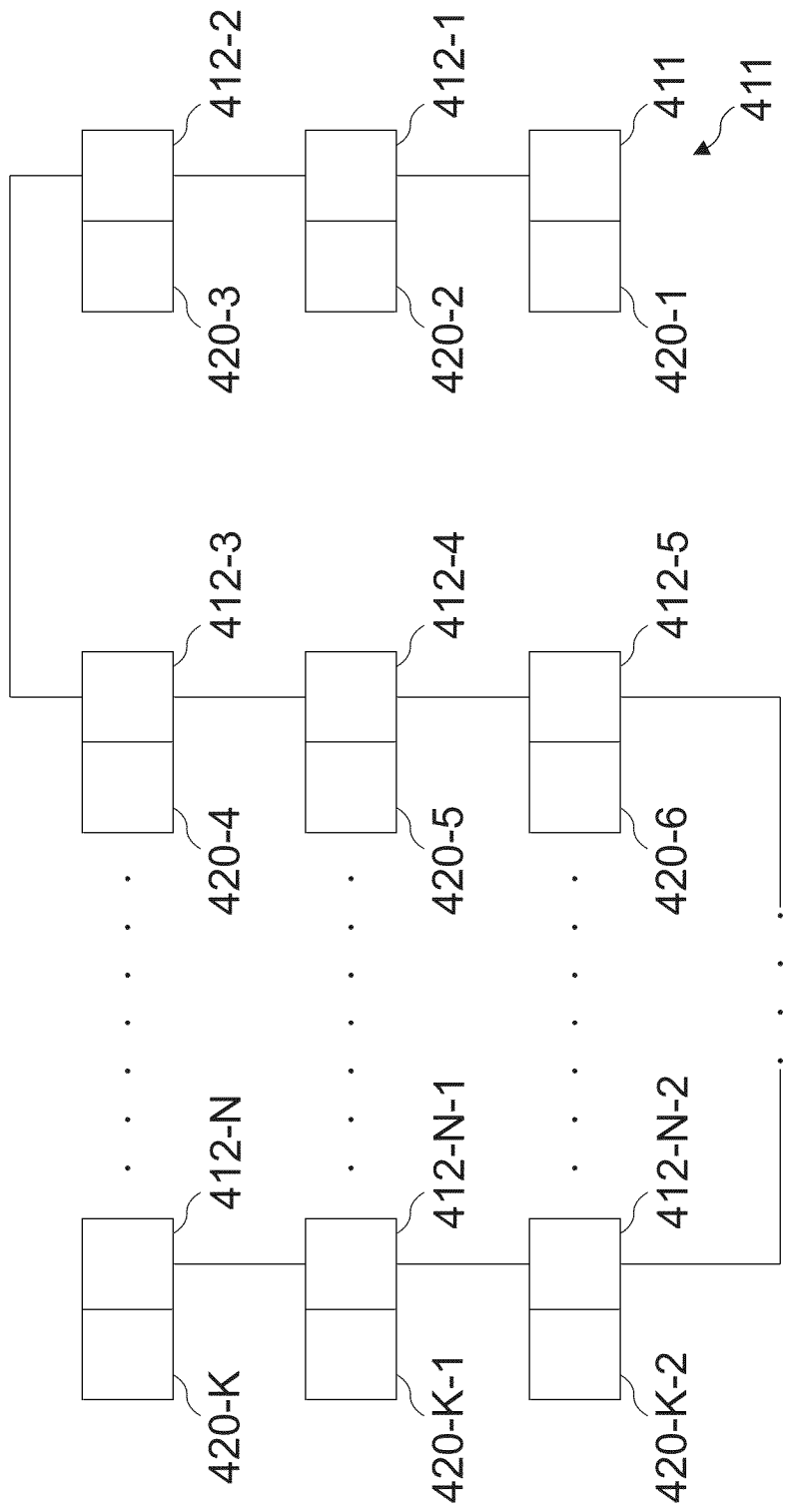
FIG. 4 illustrates an example of an electronic system.

FIG. 4 illustrates an example of an electronic system 400 using an apparatus 410 for generating synchronized clock signals according to one or more aspects of the architecture described above in connection with FIG. 1 to 3 or one or more examples described above in connection with FIGS. 1 to 3.

The electronic system 400 comprises an array of electronic elements 420-1, . . . , 420-K. In the example of FIG. 4, the electronic elements 420-1, . . . , 420-K are arranged in a two-dimensional array. However, the proposed architecture is not limited to two-dimensional arrays. In other examples, the array of electronic elements 420-1, . . . , 420-K may be a one-dimensional or and three-dimensional array. The electronic elements 420-1, . . . , 420-K operate based on at least one respective clock signal. Therefore, each of the electronic elements 420-1, . . . , 420-K comprises a respective input node for a clock signal (not illustrated).

The first circuit 411 of the apparatus 410 is located adjacent to the electronic element 420-1 and configured to provide the second clock signal to the input node of the electronic element 420-1.

Similarly, each one of the series of second circuits 412-1, . . . , 412-N of the apparatus 410 is located adjacent to a respective other electronic element 420-2, . . . , 420-K and configured to provide its replica of the second clock signal to the input node of the respective electronic element 420-2, . . . , 420-K.

Accordingly, synchronized clock signals may be provided to the individual electronic elements of the array of electronic elements 420-1, . . . , 420-K. Similar to what is described above, the first circuit 411 and the series of second circuits 412-1, . . . , 412-N may provide additional synchronized clock signals at further frequencies to the electronic elements 420-1, . . . , 420-K.

The electronic elements 420-1, . . . , 420-K may, e.g., be one of digital-to-analog converter cells of a digital-to-analog converter, analog-to-digital converter cells of an analog-to-digital converter and clock distribution sub-networks of a clock distribution network. However, the proposed clock signal generation is not limited to these examples. In general, the proposed clock signal generation may be used for any electronic system using (demanding/requiring) a plurality of synchronized clock signals. For example, the electronic system 400 may be one of a consumer product, a base station, a mobile device, a router (wired or wireless), an ethernet switch, a transmitter (wired or wireless), a receiver (wired or wireless), a transceiver (wired or wireless) and a clock distribution network.

In the following, a base station and a mobile device using the proposed clock signal generation will be described with more details in connection with FIGS. 5 and 6.

Figure 5:
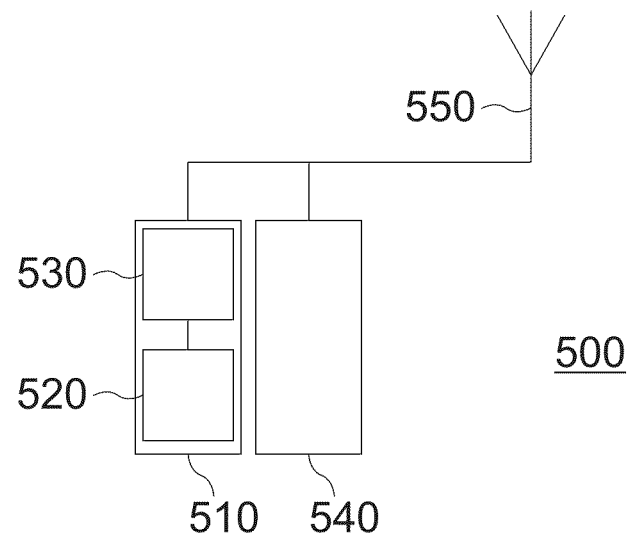
FIG. 5 illustrates an example of a base station.

FIG. 5 schematically illustrates an example of a radio base station 500 (e.g. for a femtocell, a picocell, a microcell or a macrocell) comprising an apparatus 520 for generating synchronized clock signals as proposed.

The apparatus 520 for generating synchronized clock signals is part of a receiver 510 (being an example for an electronic system). The receiver 510 additionally comprises an analog-to-digital converter 530 coupled to the apparatus 520. Accordingly, the apparatus 520 may provide synchronized clock signals for the analog-to-digital converter cells of the analog-to-digital converter 530.

The receiver 510 is coupled to an antenna element 550 of the base station 500 (either directly or indirectly via one or more intermediate elements such as a filter or a Low Noise Amplifier, LNA).

Further, the base station 500 comprises a transmitter 540 configured to generate a Radio Frequency (RF) transmit signal. The transmitter 540 may use the antenna element 550 or another antenna element (not illustrated) of the base station 500 for radiating the RF transmit signal to the environment. The transmitter 540 (being another example for an electronic system) may comprise an apparatus for generating synchronized clock signals as proposed. For example, the apparatus for generating synchronized clock signals may provide synchronized clock signals for the digital-to-analog converter cells of a digital-to-analog converter of the transmitter 540.

To this end, a base station with synchronized clock signal generation may be provided.

The base station 500 may comprise further elements such as, e.g., a baseband processor, an application processor, memory, a network controller, a user interface, power management circuitry, a satellite navigation receiver, a network interface controller or power tee circuitry.

In some aspects, the application processor may include one or more Central Processing Unit CPU cores and one or more of cache memory, a Low-DropOut (LDO) voltage regulator, interrupt controllers, serial interfaces such as Serial Peripheral Interface (SPI), Inter-Integrated Circuit ($I^2C$) or universal programmable serial interface module, Real Time Clock (RTC), timer-counters including interval and watchdog timers, general purpose Input-Output (IO), memory card controllers such as Secure Digital (SD)/MultiMedia Card (MMC) or similar, Universal Serial Bus (USB) interfaces, Mobile Industry Processor Interface Alliance (MIPI) interfaces and Joint Test Access Group (JTAG) test access ports.

In some aspects, the baseband processor may be implemented, for example, as a solder-down substrate including one or more integrated circuits, a single packaged integrated circuit soldered to a main circuit board or a multi-chip module containing two or more integrated circuits.

In some aspects, the memory may include one or more of volatile memory including Dynamic Random Access Memory (DRAM) and/or Synchronous Dynamic Random Access Memory (SDRAM), and Non-Volatile Memory (NVM) including high-speed electrically erasable memory (commonly referred to as Flash memory), Phase change Random Access Memory (PRAM), Magnetoresistive Random Access Memory (MRAM) and/or a three-dimensional crosspoint (3D XPoint) memory. The memory may be implemented as one or more of solder down packaged integrated circuits, socketed memory modules and plug-in memory cards.

In some aspects, the power management integrated circuitry may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, the power tee circuitry may provide for electrical power drawn from a network cable to provide both power supply and data connectivity to the base station using a single cable.

In some aspects, the network controller may provide connectivity to a network using a standard network interface protocol such as Ethernet. Network connectivity may be provided using a physical connection which is one of electrical (commonly referred to as copper interconnect), optical or wireless.

In some aspects, the satellite navigation receiver module may include circuitry to receive and decode signals transmitted by one or more navigation satellite constellations such as the Global Positioning System (GPS), GLObalnaya NAvigatSionnaya Sputnikovaya Sistema (GLONASS), Galileo and/or BeiDou. The receiver may provide data to the application processor which may include one or more of position data or time data. The application processor may use time data to synchronize operations with other radio base stations.

In some aspects, the user interface may include one or more of physical or virtual buttons, such as a reset button, one or more indicators such as Light Emitting Diodes (LEDs) and a display screen.

Figure 6:
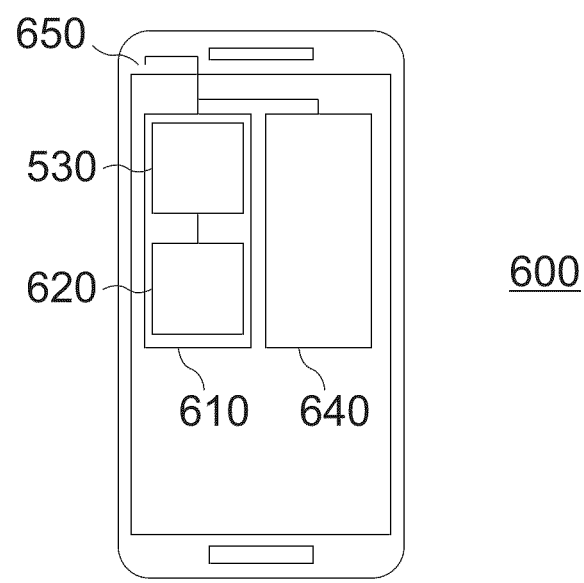
FIG. 6 illustrates an example of a mobile device.

FIG. 6 schematically illustrates an example of a mobile device 600 (e.g. mobile phone, smartphone, tablet-computer, or laptop) comprising an apparatus 620 for generating synchronized clock signals as proposed.

The apparatus 620 for generating synchronized clock signals is part of a receiver 610 (being another example for an electronic system). The receiver 610 additionally comprises an analog-to-digital converter 630 coupled to the apparatus 620. Accordingly, the apparatus 620 may provide synchronized clock signals for the analog-to-digital converter cells of the analog-to-digital converter 630.

The receiver 610 is coupled to an antenna element 650 of the mobile device 600 (either directly or indirectly via one or more intermediate elements such as a filter or an LNA).

Further, the mobile device 600 comprises a transmitter 640 configured to generate a RF transmit signal. The transmitter 640 may use the antenna element 650 or another antenna element (not illustrated) of the mobile device 600 for radiating the RF transmit signal to the environment. The transmitter 640 (being another example for an electronic system) may comprise an apparatus for generating synchronized clock signals as proposed. For example, the apparatus for generating synchronized clock signals may provide synchronized clock signals for the digital-to-analog converter cells of a digital-to-analog converter of the transmitter 640.

To this end, a mobile device with synchronized clock signal generation may be provided.

The mobile device 600 may comprise further elements such as, e.g., a baseband processor, memory, a connectivity module, a Near Field Communication (NFC) controller, an audio driver, a camera driver, a touch screen, a display driver, sensors, removable memory, a power management integrated circuit or a smart battery.

In some aspects, the application processor may include, for example, one or more CPU cores and one or more of cache memory, LDO regulators, interrupt controllers, serial interfaces such as SPI, I²C or universal programmable serial interface module, RTC, timer-counters including interval and watchdog timers, general purpose input-output (TO), memory card controllers such as SD/MMC or similar, USB interfaces, MIPI interfaces and JTAG test access ports.

In some aspects, the baseband module may be implemented, for example, as a solder-down substrate including one or more integrated circuits, a single packaged integrated circuit soldered to a main circuit board, and/or a multi-chip module containing two or more integrated circuits.

The wireless communication circuits using clock signal generation according to the proposed architectures or one or more of the examples described above may be configured to operate according to one of the 3GPP-standardized mobile communication networks or systems. The mobile or wireless communication system may correspond to, for example, a 5G NR, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM), an Enhanced Data rates for GSM Evolution (EDGE) network, or a GSM/EDGE Radio Access Network (GERAN). Alternatively, the wireless communication circuits may be configured to operate according to mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

The examples described herein may be summarized as follows:

Example 1 is an apparatus for generating synchronized clock signals, comprising: a first circuit comprising a clock divider circuit configured to receive a first clock signal and to generate a second clock signal by frequency dividing the first clock signal; and one or more second circuits each comprising a respective synchronization circuit configured to receive the first clock signal, wherein the synchronization circuit of one of the one or more second circuits is configured to receive the second clock signal from the first circuit and to resample the second clock signal based on the first clock signal in order to generate a replica of the second clock signal that is in phase with the second clock signal.

Example 2 is the apparatus of example 1, wherein the apparatus comprises a plurality of second circuits forming a series of second circuits, wherein the one second circuit configured to receive the second clock signal from the first circuit is the first one of the series of second circuits, and wherein the synchronization circuits of the other ones of the series of second circuits are configured to receive the respective replica of the second clock signal generated by the respective preceding second circuit in the series of second circuits and to resample the respectively received replica of the second clock signal based on the first clock signal in order to generate a respective replica of the second clock signal that is in phase with the second clock signal.

Example 3 is the apparatus of example 2, wherein the first circuit comprises an output node for outputting the generated second clock signal, and wherein each of the second circuits comprises a respective output node for outputting the respectively generated replica of the second clock signal.

Example 4 is the apparatus of example 2 or example 3, wherein the first circuit further comprises a second clock divider circuit configured to receive the second clock signal and to generate a third clock signal by frequency dividing the second clock signal.

Example 5 is the apparatus of example 4, wherein: each of the series of second circuits comprises a respective second synchronization circuit configured to receive the first clock signal; the second synchronization circuit of the first one of the series of second circuits is configured to receive the third clock signal from the first circuit and to resample the third clock signal based on the first clock signal in order to generate a replica of the third clock signal that is in phase with the third clock signal; and wherein the second synchronization circuits of the other ones of the series of second circuits are configured to receive the respective replica of the third clock signal generated by the respective preceding second circuit in the series of second circuits and to resample the respectively received replica of the third clock signal based on the first clock signal in order to generate a respective replica of the third clock signal that is in phase with the third clock signal.

Example 6 is the apparatus of example 4, wherein: each of the series of second circuits comprises a respective second synchronization circuit configured to receive the respective replica of the second clock signal generated locally at the respective second circuit; wherein the second synchronization circuit of the first one of the series of second circuits is configured to receive the third clock signal from the first circuit and to resample the third clock signal based on the replica of the second clock signal generated locally at the first one of the series of second circuits in order to generate a replica of the third clock signal that is in phase with the third clock signal; and wherein the second synchronization circuits of the other ones of the series of second circuits are configured to receive the respective replica of the third clock signal generated by the respective preceding second circuit in the series of second circuits and to resample the respectively received replica of the third clock signal based on the respective replica of the second clock signal generated locally at the respective second circuit in order to generate a respective replica of the third clock signal that is in phase with the third clock signal.

Example 7 is the apparatus of example 5 or example 6, wherein the first circuit comprises a second output node for outputting the third clock signal, and wherein each of the second circuits comprises a respective second output node for outputting the respective replica of the third clock signal.

Example 8 is the apparatus of any of examples 4 to 7, wherein the clock divider circuit and the second clock divider circuit are implemented identical.

Example 9 is the apparatus of any of examples 4 to 7, wherein the clock divider circuit and the second clock divider circuit are implemented different.

Example 10 is the apparatus of any of examples 2 to 9, wherein the synchronization circuits of the second circuits are implemented identical.

Example 11 is the apparatus of any of examples 2 to 9, wherein the synchronization circuits of the second circuits are implemented different.

Example 12 is the apparatus of any of examples 1 to 11, wherein the clock divider circuit is configured to frequency divide the first clock signal by an integer value.

Example 13 is the apparatus of any of examples 1 to 11, wherein the clock divider circuit is configured to frequency divide the first clock signal by a fractional value.

Example 14 is the apparatus of any of examples 1 to 13, wherein the first clock signal is a single-ended signal.

Example 15 is the apparatus of any of examples 1 to 13, wherein the first clock signal is a differential signal.

Example 16 is an electronic system, comprising: the apparatus according to any of examples 1 to 15; and an array of electronic elements each comprising an input node for a clock signal, wherein the first circuit is located adjacent to one of the electronic elements and configured to provide the second clock signal to the input node of the one of the electronic elements, and wherein each one of the one or more second circuits is located adjacent to a respective other one of the electronic elements and configured to provide its replica of the second clock signal to the input node of the respective electronic element.

Example 17 is the electronic system of example 16, wherein the electronic elements are one of digital-to-analog converter cells, analog-to-digital converter cells and clock distribution sub-networks.

Example 18 is the electronic system of example 16 or example 17, wherein the electronic system is one of a consumer product, a base station, a mobile device, a router, an ethernet switch, a transmitter, a receiver, a transceiver and a clock distribution network.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. An apparatus for generating synchronized clock signals, comprising:
 a first circuit comprising a clock divider circuit configured to receive a first clock signal and to generate a second clock signal by frequency dividing the first clock signal; and
 one or more second circuits each comprising a respective synchronization circuit configured to receive the first clock signal,
 wherein the synchronization circuit of one of the one or more second circuits is configured to receive the second clock signal from the first circuit and to resample the second clock signal based on the first clock signal in order to generate a replica of the second clock signal that is in phase with the second clock signal,
 wherein the apparatus comprises a plurality of second circuits forming a series of second circuits, wherein the one second circuit configured to receive the second clock signal from the first circuit is the first one of the series of second circuits, and wherein the synchronization circuits of the other ones of the series of second circuits are configured to receive the respective replica of the second clock signal generated by the respective preceding second circuit in the series of second circuits and to resample the respectively received replica of the second clock signal based on the first clock signal in order to generate a respective replica of the second clock signal that is in phase with the second clock signal,
 wherein the first circuit further comprises a second clock divider circuit configured to receive the second clock signal and to generate a third clock signal by frequency dividing the second clock signal.

2. The apparatus of claim 1, wherein the first circuit comprises an output node for outputting the generated second clock signal, and wherein each of the second circuits comprises a respective output node for outputting the respectively generated replica of the second clock signal.

3. The apparatus of claim 1, wherein:
 each of the series of second circuits comprises a respective second synchronization circuit configured to receive the first clock signal;
 the second synchronization circuit of the first one of the series of second circuits is configured to receive the third clock signal from the first circuit and to resample the third clock signal based on the first clock signal in order to generate a replica of the third clock signal that is in phase with the third clock signal; and
 wherein the second synchronization circuits of the other ones of the series of second circuits are configured to receive the respective replica of the third clock signal generated by the respective preceding second circuit in the series of second circuits and to resample the respectively received replica of the third clock signal based on the first clock signal in order to generate a respective replica of the third clock signal that is in phase with the third clock signal.

4. The apparatus of claim 3, wherein the first circuit comprises a second output node for outputting the third clock signal, and wherein each of the second circuits comprises a respective second output node for outputting the respective replica of the third clock signal.

5. The apparatus of claim 1, wherein:
 each of the series of second circuits comprises a respective second synchronization circuit configured to receive the respective replica of the second clock signal generated locally at the respective second circuit;
 wherein the second synchronization circuit of the first one of the series of second circuits is configured to receive the third clock signal from the first circuit and to resample the third clock signal based on the replica of the second clock signal generated locally at the first one of the series of second circuits in order to generate a replica of the third clock signal that is in phase with the third clock signal; and
 wherein the second synchronization circuits of the other ones of the series of second circuits are configured to receive the respective replica of the third clock signal generated by the respective preceding second circuit in the series of second circuits and to resample the respectively received replica of the third clock signal based on the respective replica of the second clock signal generated locally at the respective second circuit in order to generate a respective replica of the third clock signal that is in phase with the third clock signal.

6. The apparatus of claim 1, wherein the clock divider circuit and the second clock divider circuit are implemented identical.

7. The apparatus of claim 1, wherein the clock divider circuit and the second clock divider circuit are implemented different.

8. The apparatus of claim 1, wherein the synchronization circuits of the second circuits are implemented identical.

9. The apparatus of claim 1, wherein the synchronization circuits of the second circuits are implemented different.

10. The apparatus of claim 1, wherein the clock divider circuit is configured to frequency divide the first clock signal by an integer value.

11. The apparatus of claim 1, wherein the clock divider circuit is configured to frequency divide the first clock signal by a fractional value.

12. The apparatus of claim 1, wherein the first clock signal is a single-ended signal.

13. The apparatus of claim 1, wherein the first clock signal is a differential signal.

14. An electronic system, comprising:
 the apparatus according to claim 1; and
 an array of electronic elements each comprising an input node for a clock signal,
 wherein the first circuit is located adjacent to one of the electronic elements and configured to provide the second clock signal to the input node of the one of the electronic elements, and
 wherein each one of the one or more second circuits is located adjacent to a respective other one of the electronic elements and configured to provide its replica of the second clock signal to the input node of the respective electronic element.

15. The electronic system of claim 14, wherein the electronic elements are one of digital-to-analog converter cells, analog-to-digital converter cells and clock distribution sub-networks.

16. The electronic system of claim 14, wherein the electronic system is one of a consumer product, a base station, a mobile device, a router, an ethernet switch, a transmitter, a receiver, a transceiver and a clock distribution network.

* * * * *